United States Patent
Yue et al.

(10) Patent No.: US 11,580,678 B2
(45) Date of Patent: Feb. 14, 2023

(54) SYSTEMS AND METHODS FOR INTERPOLATION WITH RESOLUTION PRESERVATION

(71) Applicant: GE Precision Healthcare LLC, Milwaukee, WI (US)

(72) Inventors: Meghan Yue, Johnson Creek, WI (US); Elizabeth Janus Nett, Wauwatosa, WI (US); Brian Nett, Wauwatosa, WI (US)

(73) Assignee: GE Precision Healthcare LLC, Milwaukee, WI (US)

( * ) Notice: Subject to any disclaimer, the term of this patent is extended or adjusted under 35 U.S.C. 154(b) by 46 days.

(21) Appl. No.: 16/806,958

(22) Filed: Mar. 2, 2020

(65) Prior Publication Data

US 2021/0272336 A1 Sep. 2, 2021

(51) Int. Cl.
*G06T 11/00* (2006.01)
*G06T 7/00* (2017.01)
(Continued)

(52) U.S. Cl.
CPC ............ *G06T 11/008* (2013.01); *G06T 5/005* (2013.01); *G06T 5/10* (2013.01); *G06T 5/20* (2013.01);
(Continued)

(58) Field of Classification Search
CPC ....... G06T 11/008; G06T 7/11; G06T 7/0012; G06T 5/002; G06T 5/005; G06T 5/10; G06T 5/20; G06T 5/50; G06T 2207/10081; G06T 2207/20036; G06T 2207/20081; G06T 2207/30004; G06T 2207/30168; A61B 6/032; G06N 20/00; G06N 20/10; G06N 20/20
See application file for complete search history.

(56) References Cited

U.S. PATENT DOCUMENTS 10,573,030 B2 * 2/2020 Keeler ................. G06T 11/008
2011/0007956 A1 * 1/2011 Meyer .................... A61B 6/504
382/131

(Continued)

FOREIGN PATENT DOCUMENTS

CN 103679642 A * 3/2014

OTHER PUBLICATIONS

Meyer et al., "Frequency split metal artifact reduction (FSMAR) in computer tomography", 2012, Medical Physics, vol. 39 Issue 4, pp. 1904-1916. (Year: 2012).*

(Continued)

*Primary Examiner* — Vu Le
*Assistant Examiner* — Julius Chai
(74) *Attorney, Agent, or Firm* — McCoy Russell LLP

(57) ABSTRACT

Various methods and systems are provided for artifact reduction with resolution preservation. In one example, a method includes obtaining projection data of an imaging subject, identifying a metal-containing region in the projection data, interpolating the metal-containing region to generate interpolated projection data, extracting high frequency content information from the projection data in the metal-containing region, adding the extracted high frequency content information to the interpolated projection data to generate adjusted projection data, and reconstructing one or more diagnostic images from the adjusted projection data.

15 Claims, 5 Drawing Sheets

(51) Int. Cl.
*G06T 7/11* (2017.01)
*G06T 5/10* (2006.01)
*G06T 5/20* (2006.01)
*G06T 5/00* (2006.01)

(52) U.S. Cl.
CPC .............. *G06T 7/0012* (2013.01); *G06T 7/11* (2017.01); *G06T 2207/10081* (2013.01); *G06T 2207/20036* (2013.01); *G06T 2207/20081* (2013.01); *G06T 2207/30004* (2013.01); *G06T 2207/30168* (2013.01)

(56) References Cited

U.S. PATENT DOCUMENTS

| | | | |
|---|---|---|---|
| 2012/0008845 A1* | 1/2012 | Ning | A61B 6/488 382/131 |
| 2013/0039556 A1* | 2/2013 | Kachelriess | G06T 5/003 382/131 |
| 2016/0163071 A1* | 6/2016 | Han | G06T 11/008 382/131 |
| 2017/0301066 A1* | 10/2017 | Wang | G06T 11/008 |
| 2018/0350113 A1* | 12/2018 | Goto | A61B 6/5258 |
| 2019/0380670 A1* | 12/2019 | Hofmann | A61B 6/5258 |
| 2020/0327662 A1* | 10/2020 | Liu | G06T 7/10 |

OTHER PUBLICATIONS

Kalender et al., "Reduction of CT Artifacts Caused by Metallic Implants", Radiology, vol. 164, No. 2, Aug. 1987 (Year: 1987).*
Meyer, E. et al., "Normalized metal artifact reduction (NMAR) in computed tomography," Medical Physics, vol. 37, No. 10, Oct. 2010, 12 pages.
Meyer, E. et al., "Frequency split metal artifact reduction (FSMAR) in computed tomography," Medical Physics, vol. 39, No. 4, Apr. 2012, 13 pages.

* cited by examiner

SYSTEMS AND METHODS FOR INTERPOLATION WITH RESOLUTION PRESERVATION

FIELD

This disclosure relates generally to diagnostic imaging and, more particularly, to reducing artifacts due to high-density objects in computed tomography (CT).

BACKGROUND

Typically, in computed tomography (CT) imaging systems, an x-ray source emits a beam of x-ray radiation toward a subject or object, such as a patient or a piece of luggage. The beam, after being attenuated by the subject, impinges upon an array of radiation detectors. The intensity of the attenuated beam radiation received at the detector array is typically dependent upon the attenuation of the x-ray radiation beam by the subject. Each detector element of the detector array produces a separate electrical signal indicative of the attenuated beam received by each detector element. The electrical signals are transmitted to a data processing system for analysis which ultimately produces an image.

Objects with high x-ray absorption properties (e.g., metal) can cause artifacts in reconstructed CT images, often resulting in images having low or non-diagnostic image quality. For example, metal implants such as amalgam dental fillings, joint replacements (e.g., plates and/or pins used in hips, knees, shoulders, etc.), surgical clips, biopsy needles, or other hardware may generate streak or starburst artifacts in the formation of such images. Such artifacts typically result from a sharp difference in signal attenuation at the boundary of the metal implants and a patient's anatomy.

BRIEF DESCRIPTION

In one embodiment, a method includes obtaining projection data of an imaging subject, identifying a metal-containing region in the projection data, interpolating the metal-containing region to generate interpolated projection data, extracting high frequency content information from the projection data in the metal-containing region, adding the extracted high frequency content information to the interpolated projection data to generate adjusted projection data, and reconstructing one or more diagnostic images from the adjusted projection data.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

Figure 1:
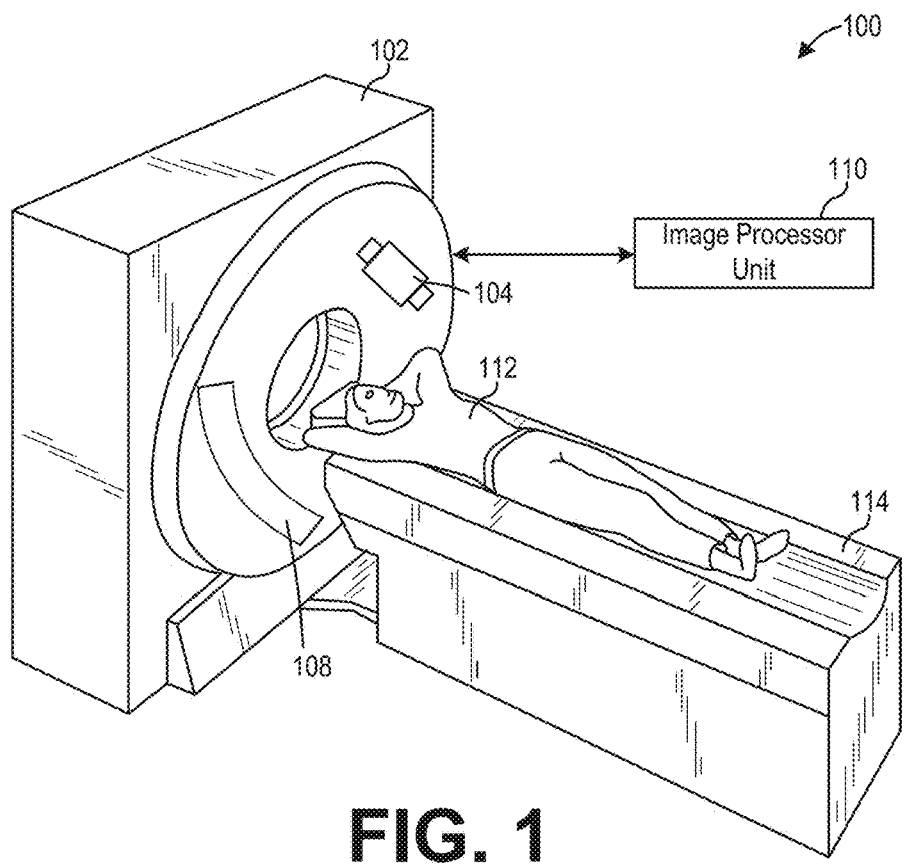
FIG. 1 shows a pictorial view of an imaging system, according to an embodiment.

The present disclosure is directed to systems and methods for addressing imaging artifacts, such as metal artifacts, while preserving image resolution in diagnostic medical images. High density objects such as metal present in the body of patients can cause artifacts that may hinder a diagnosis. These artifacts may be caused due to several factors such as beam-hardening, scatter, photon starvation, partial volume, aliasing, and under-range in the data acquisition, as examples. The artifacts may be reduced by metal artifact reduction (MAR) techniques. For instance, advanced beam-hardening, noise reduction, and scatter correction have been proposed for standard filtered back-projection algorithm. In another example, an iterative reconstruction algorithm for MAR incorporates the shape of the metal and may use a polyenergetic model to reduce beam-hardening artifacts. These algorithms belong to a category generally referred to as model-based algorithms.

In addition to the category of model-based algorithms, another class of algorithms can be described as "sinogram in-painting." In this class of algorithms, the sinogram data that is corrupted by the high-density object is discarded and replaced by either data interpolated using neighboring projections or data estimated by solving a cost function using some iterative algorithms, or by a forward projection of a prior image. These methods can be single steps or can involve successive refinements via an iterative process.

Pure interpolation techniques, however, may create additional artifacts in the reconstructed image due to inconsistency in the data, and thus a two-pass technique may be applied that includes a first step of correction using an interpolation technique and the resultant first pass image is then used to generate a prior image. During the second pass the corrupted data is replaced by the forward projection of the prior image to generate the in-painted sinogram.

In a typical CT acquisition a prior image is not available and hence may be generated using corrupted data. In an ideal sense, the prior image should include any knowledge of the object without the high-density artifacts. Availability of an atlas, and then registering the images to the atlas, can in principle lead to a prior image. In practice, the prior image is typically generated by performing a non-linear transformation on either the original image or a first pass MAR image. However, it is often challenging to use the original image in the presence of metal (or high density) artifacts, and a first-pass MAR image typically has degraded information content close to the metal, thus the first-pass MAR image is not consistent with the original image, and non-linear processing will not add content to the prior image.

In another approach, the in-painted sinogram data can be combined with the original data to generate projection data which can then be fed to a reconstruction algorithm. This approach is general enough and can be used in conjunction with in-painted data generated using any of the methods described above. However, these in-painting techniques generally result in loss of resolution near the metal or high-density artifact.

Thus, according to embodiments disclosed herein, the image resolution in the vicinity of a metal artifact or other high-density artifact may be maintained while addressing the metal or high-density artifact. To accomplish the resolution preservation while addressing the high density artifact, the high frequency content of the projection data in the identified metal/high-density region is extracted and conditioned and added back to the interpolated projection data to preserve resolution and enable artifact reduction in the image domain.

Figure 2:
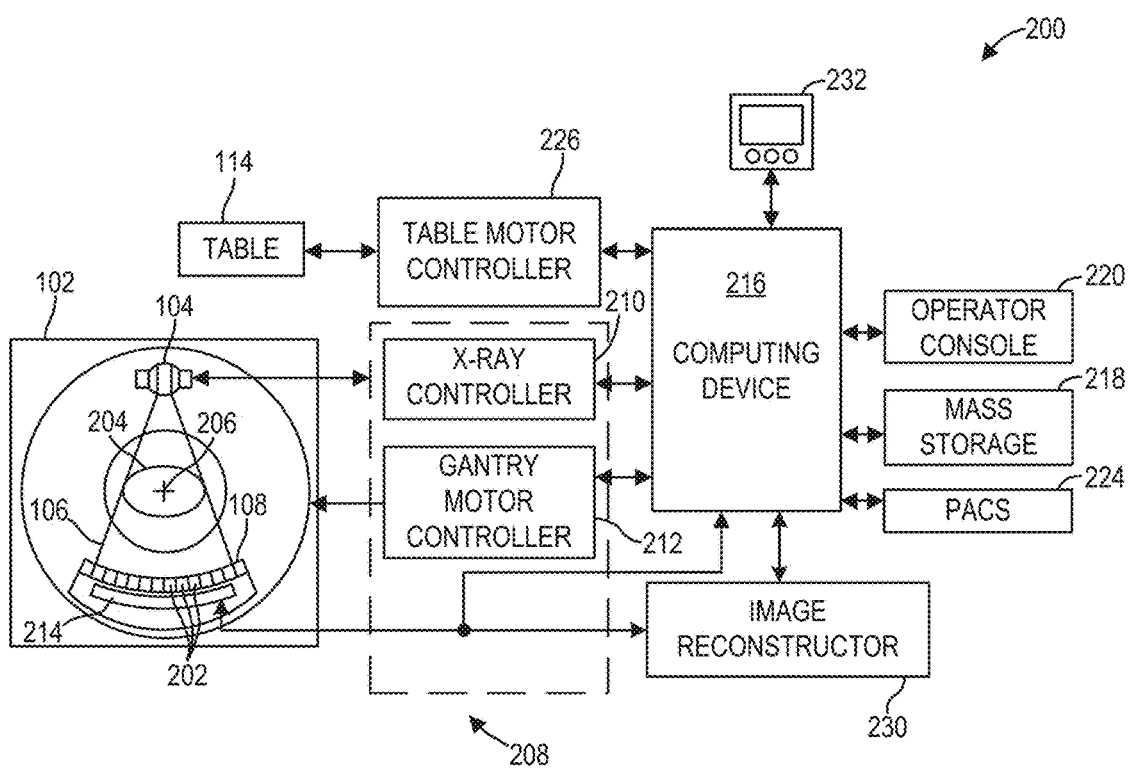
FIG. 2 shows a block schematic diagram of an exemplary imaging system, according to an embodiment.
Figure 5:
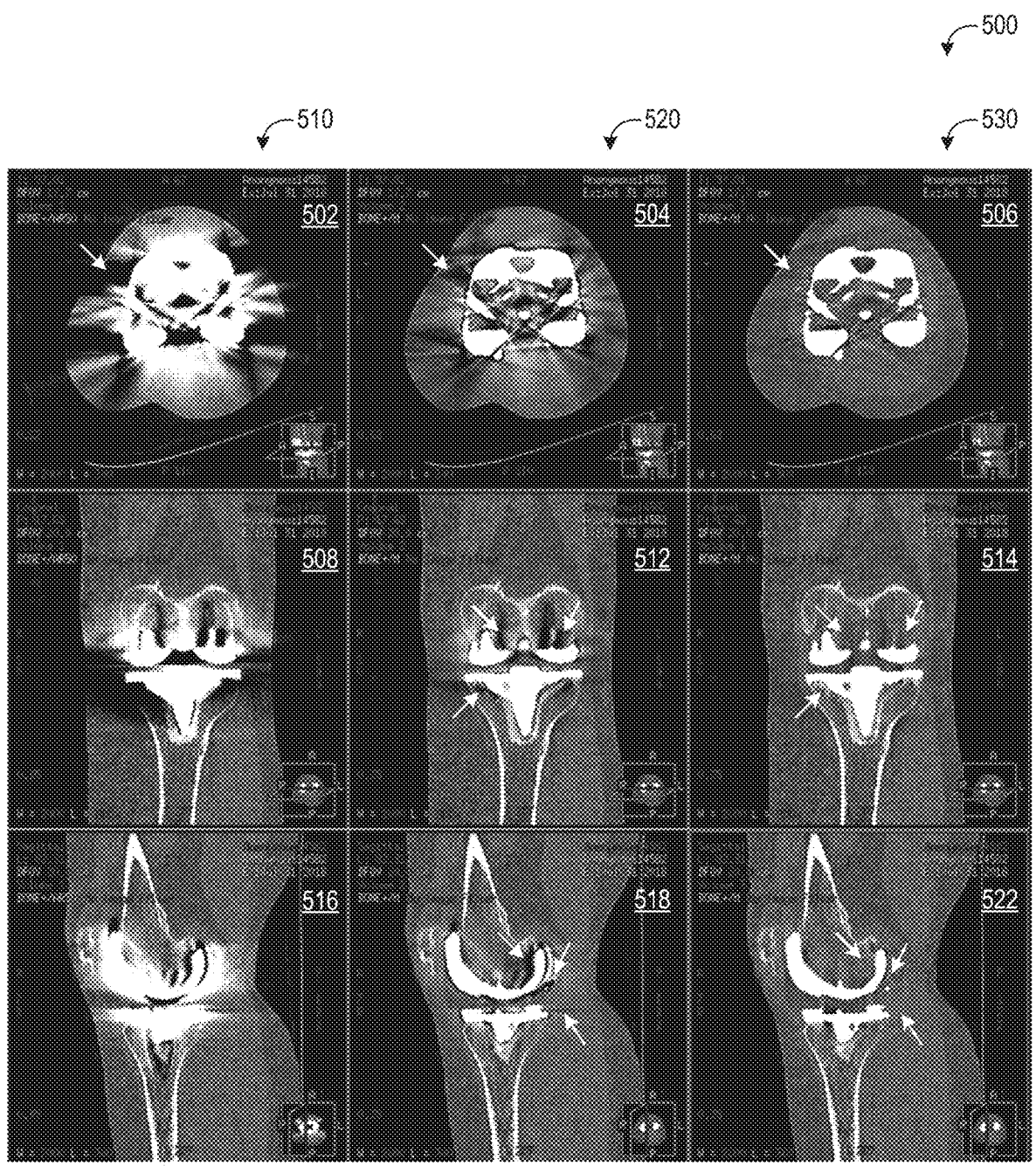
FIGS. 5 and 6 show example images reconstructed from projection data, according to examples of the present disclosure.
Figure 6:
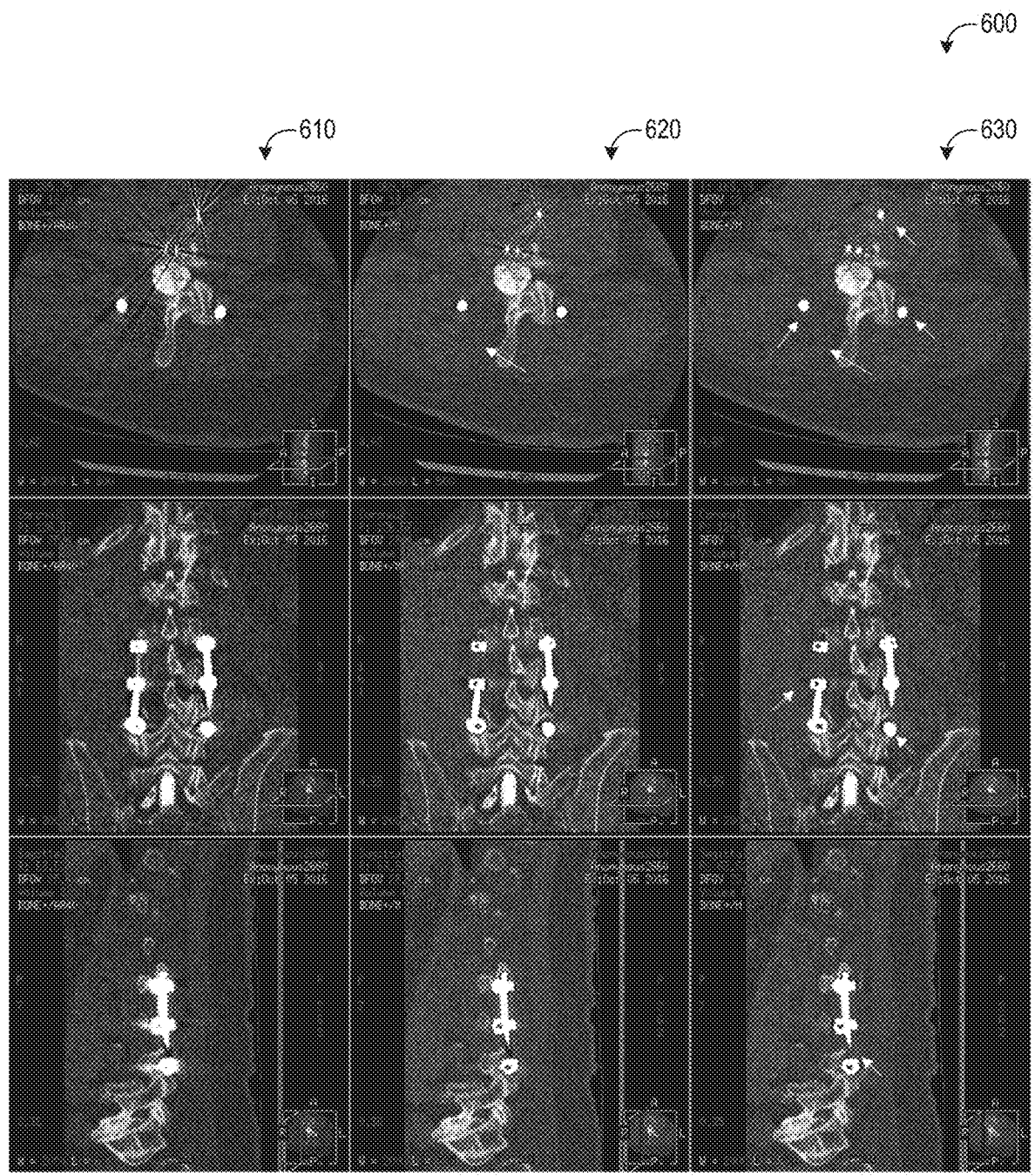

The metal artifact reduction method described herein may include initially reconstructing projection data obtained via a CT imaging system, such as the CT system of FIGS. 1 and 2, to generate an initial image in order to identify where metal or another high-density object is located. The identified metal in the initial image may be mapped back to the view (projection) domain. Any place where metal is located in the projection data may determined to be corrupted. Thus, the method described herein, such as the method shown in FIG. 3, interpolates over a metal region to remove the corrupted data and replace the data with the interpolated data. However, interpolation causes loss of high frequency information, which causes blurring and other residual artifacts. To counteract this blurring and other residual artifacts, the metal artifact reduction method described herein extracts the high frequency information in the metal-containing region of the original (e.g., non-interpolated) projection data and then adds the high frequency information back in to the interpolated projection data, as schematically represented by the sequence of images shown in FIG. 4. Further, the high frequency content is conditioned prior to adding the high frequency content to the interpolated data to avoid streaking. For example, the edges of a metal object may include a relatively high amount of high frequency content and including an excess of high frequency content (e.g., relative to the middle of the metal object) may introduce streaking artifacts. Additionally, the high frequency content may include noise, and the conditioning may discard this noise. The conditioning may include weighting, thresholding, or filtration, such as different weighting schemes or thresholding to de-weight at the edge of the metal. In some examples, dilation and/or erosion may be used to weigh which frequency content to include. The high frequency information may be extracted using a 2-D or 3-D filter on each view to smooth data out, and the smoothed image may be subtracted from the original to extract the high frequency content. Once the high frequency information is extracted, conditioned, and added to the interpolated projection data, the interpolated projection data (with the high frequency content) may be reconstructed into one or more diagnostic images, examples of which are shown in FIGS. 5 and 6.

FIG. 1 illustrates an exemplary CT system 100 configured for CT imaging. Particularly, the CT system 100 is configured to image a subject 112 such as a patient, an inanimate object, one or more manufactured parts, and/or foreign objects such as dental implants, stents, and/or contrast agents present within the body. In one embodiment, the CT system 100 includes a gantry 102, which in turn, may further include at least one x-ray source 104 configured to project a beam of x-ray radiation 106 (see FIG. 2) for use in imaging the subject 112 laying on a table 114. Specifically, the x-ray source 104 is configured to project the x-ray radiation beams 106 towards a detector array 108 positioned on the opposite side of the gantry 102. Although FIG. 1 depicts only a single x-ray source 104, in certain embodiments, multiple x-ray sources and detectors may be employed to project a plurality of x-ray radiation beams 106 for acquiring projection data at different energy levels corresponding to the patient. In some embodiments, the x-ray source 104 may enable dual-energy gemstone spectral imaging (GSI) by rapid peak kilovoltage (kVp) switching. In some embodiments, the x-ray detector employed is a photon-counting detector which is capable of differentiating x-ray photons of different energies. In other embodiments, two sets of x-ray sources and detectors are used to generate dual-energy projections, with one set at low-kVp and the other at high-kVp. It should thus be appreciated that the methods described herein may be implemented with single energy acquisition techniques as well as dual energy acquisition techniques.

In certain embodiments, the CT system 100 further includes an image processor unit 110 configured to reconstruct images of a target volume of the subject 112 using an iterative or analytic image reconstruction method. For example, the image processor unit 110 may use an analytic image reconstruction approach such as filtered back projection (FBP) to reconstruct images of a target volume of the patient. As another example, the image processor unit 110 may use an iterative image reconstruction approach such as advanced statistical iterative reconstruction (ASIR), conjugate gradient (CG), maximum likelihood expectation maximization (MLEM), model-based iterative reconstruction (MBIR), and so on to reconstruct images of a target volume of the subject 112. As described further herein, in some examples the image processor unit 110 may use both an analytic image reconstruction approach such as FBP in addition to an iterative image reconstruction approach.

In some CT imaging system configurations, an x-ray source projects a cone-shaped x-ray radiation beam which is collimated to lie within an X-Y-Z plane of a Cartesian coordinate system and generally referred to as an "imaging plane." The x-ray radiation beam passes through an object being imaged, such as the patient or subject. The x-ray radiation beam, after being attenuated by the object, impinges upon an array of detector elements. The intensity of the attenuated x-ray radiation beam received at the detector array is dependent upon the attenuation of a radiation beam by the object. Each detector element of the array produces a separate electrical signal that is a measurement of the x-ray beam attenuation at the detector location. The attenuation measurements from all the detector elements are acquired separately to produce a transmission profile.

In some CT systems, the x-ray source and the detector array are rotated with a gantry within the imaging plane and around the object to be imaged such that an angle at which the radiation beam intersects the object constantly changes. A group of x-ray radiation attenuation measurements, e.g., projection data, from the detector array at one gantry angle is referred to as a "view." A "scan" of the object includes a set of views made at different gantry angles, or view angles, during one revolution of the x-ray source and detector. It is contemplated that the benefits of the methods described herein accrue to medical imaging modalities other than CT, so as used herein the term "view" is not limited to the use as described above with respect to projection data from one gantry angle. The term "view" is used to mean one data acquisition whenever there are multiple data acquisitions from different angles, whether from a CT, positron emission tomography (PET), or single-photon emission CT (SPECT) acquisition, and/or any other modality including modalities yet to be developed as well as combinations thereof in fused embodiments.

The projection data is processed to reconstruct an image that corresponds to a two-dimensional slice taken through the object or, in some examples where the projection data includes multiple views or scans, a three-dimensional rendering of the object. One method for reconstructing an image from a set of projection data is referred to in the art as the filtered back projection technique. Transmission and emission tomography reconstruction techniques also include statistical iterative methods such as maximum likelihood expectation maximization (MLEM) and ordered-subsets expectation-reconstruction techniques as well as iterative reconstruction techniques. This process converts the attenuation measurements from a scan into integers called "CT numbers" or "Hounsfield units," which are used to control the brightness of a corresponding pixel on a display device.

To reduce the total scan time, a "helical" scan may be performed. To perform a "helical" scan, the patient is moved while the data for the prescribed number of slices is acquired. Such a system generates a single helix from a cone beam helical scan. The helix mapped out by the cone beam yields projection data from which images in each prescribed slice may be reconstructed.

As used herein, the phrase "reconstructing an image" is not intended to exclude embodiments of the present invention in which data representing an image is generated but a viewable image is not. Therefore, as used herein, the term "image" broadly refers to both viewable images and data representing a viewable image. However, many embodiments generate (or are configured to generate) at least one viewable image.

FIG. 2 illustrates an exemplary imaging system 200 similar to the CT system 100 of FIG. 1. In accordance with aspects of the present disclosure, the imaging system 200 is configured for imaging a subject 204 (e.g., the subject 112 of FIG. 1). In one embodiment, the imaging system 200 includes the detector array 108 (see FIG. 1). The detector array 108 further includes a plurality of detector elements 202 that together sense the x-ray radiation beam 106 (see FIG. 2) that pass through the subject 204 (such as a patient) to acquire corresponding projection data. Accordingly, in one embodiment, the detector array 108 is fabricated in a multi-slice configuration including the plurality of rows of cells or detector elements 202. In such a configuration, one or more additional rows of the detector elements 202 are arranged in a parallel configuration for acquiring the projection data.

In certain embodiments, the imaging system 200 is configured to traverse different angular positions around the subject 204 for acquiring desired projection data. Accordingly, the gantry 102 and the components mounted thereon may be configured to rotate about a center of rotation 206 for acquiring the projection data, for example, at different energy levels. Alternatively, in embodiments where a projection angle relative to the subject 204 varies as a function of time, the mounted components may be configured to move along a general curve rather than along a segment of a circle.

As the x-ray source 104 and the detector array 108 rotate, the detector array 108 collects data of the attenuated x-ray beams. The data collected by the detector array 108 undergoes pre-processing and calibration to condition the data to represent the line integrals of the attenuation coefficients of the scanned subject 204. The processed data are commonly called projections.

In some examples, the individual detectors or detector elements 202 of the detector array 108 may include photon-counting detectors which register the interactions of individual photons into one or more energy bins. It should be appreciated that the methods described herein may also be implemented with energy-integrating detectors.

The acquired sets of projection data may be used for basis material decomposition (BMD). During BMD, the measured projections are converted to a set of material-density projections. The material-density projections may be reconstructed to form a pair or a set of material-density map or image of each respective basis material, such as bone, soft tissue, and/or contrast agent maps. The density maps or images may be, in turn, associated to form a volume rendering of the basis material, for example, bone, soft tissue, and/or contrast agent, in the imaged volume.

Once reconstructed, the basis material image produced by the imaging system 200 reveals internal features of the subject 204, expressed in the densities of two basis materials. The density image may be displayed to show these features. In traditional approaches to diagnosis of medical conditions, such as disease states, and more generally of medical events, a radiologist or physician would consider a hard copy or display of the density image to discern characteristic features of interest. Such features might include lesions, sizes and shapes of particular anatomies or organs, and other features that would be discernable in the image based upon the skill and knowledge of the individual practitioner.

In one embodiment, the imaging system 200 includes a control mechanism 208 to control movement of the components such as rotation of the gantry 102 and the operation of the x-ray source 104. In certain embodiments, the control mechanism 208 further includes an x-ray controller 210 configured to provide power and timing signals to the x-ray source 104. Additionally, the control mechanism 208 includes a gantry motor controller 212 configured to control a rotational speed and/or position of the gantry 102 based on imaging requirements.

In certain embodiments, the control mechanism 208 further includes a data acquisition system (DAS) 214 configured to sample analog data received from the detector elements 202 and convert the analog data to digital signals for subsequent processing. The DAS 214 may be further configured to selectively aggregate analog data from a subset of the detector elements 202 into so-called macro-detectors, as described further herein. The data sampled and digitized by the DAS 214 is transmitted to a computer or computing device 216. In one example, the computing device 216 stores the data in a storage device or mass storage 218. The storage device 218, for example, may include a hard disk drive, a floppy disk drive, a compact disk-read/write (CD-R/W) drive, a Digital Versatile Disc (DVD) drive, a flash drive, and/or a solid-state storage drive.

Additionally, the computing device 216 provides commands and parameters to one or more of the DAS 214, the x-ray controller 210, and the gantry motor controller 212 for controlling system operations such as data acquisition and/or processing. In certain embodiments, the computing device 216 controls system operations based on operator input. The computing device 216 receives the operator input, for example, including commands and/or scanning parameters via an operator console 220 operatively coupled to the computing device 216. The operator console 220 may include a keyboard (not shown) or a touchscreen to allow the operator to specify the commands and/or scanning parameters.

Although FIG. 2 illustrates only one operator console 220, more than one operator console may be coupled to the imaging system 200, for example, for inputting or outputting system parameters, requesting examinations, plotting data, and/or viewing images. Further, in certain embodiments, the imaging system 200 may be coupled to multiple displays, printers, workstations, and/or similar devices located either locally or remotely, for example, within an institution or hospital, or in an entirely different location via one or more configurable wired and/or wireless networks such as the Internet and/or virtual private networks, wireless telephone networks, wireless local area networks, wired local area networks, wireless wide area networks, wired wide area networks, etc.

In one embodiment, for example, the imaging system 200 either includes, or is coupled to, a picture archiving and communications system (PACS) 224. In an exemplary implementation, the PACS 224 is further coupled to a remote system such as a radiology department information system, hospital information system, and/or to an internal or external network (not shown) to allow operators at different locations to supply commands and parameters and/or gain access to the image data.

The computing device 216 uses the operator-supplied and/or system-defined commands and parameters to operate a table motor controller 226, which in turn, may control a table 114 which may be a motorized table. Specifically, the table motor controller 226 may move the table 114 for appropriately positioning the subject 204 in the gantry 102 for acquiring projection data corresponding to the target volume of the subject 204.

As previously noted, the DAS 214 samples and digitizes the projection data acquired by the detector elements 202. Subsequently, an image reconstructor 230 uses the sampled and digitized x-ray data to perform high-speed reconstruction. Although FIG. 2 illustrates the image reconstructor 230 as a separate entity, in certain embodiments, the image reconstructor 230 may form part of the computing device 216. Alternatively, the image reconstructor 230 may be absent from the imaging system 200 and instead the computing device 216 may perform one or more functions of the image reconstructor 230. Moreover, the image reconstructor 230 may be located locally or remotely, and may be operatively connected to the imaging system 200 using a wired or wireless network. Particularly, one exemplary embodiment may use computing resources in a "cloud" network cluster for the image reconstructor 230.

In one embodiment, the image reconstructor 230 stores the images reconstructed in the storage device 218. Alternatively, the image reconstructor 230 may transmit the reconstructed images to the computing device 216 for generating useful patient information for diagnosis and evaluation. In certain embodiments, the computing device 216 may transmit the reconstructed images and/or the patient information to a display or display device 232 communicatively coupled to the computing device 216 and/or the image reconstructor 230. In some embodiments, the reconstructed images may be transmitted from the computing device 216 or the image reconstructor 230 to the storage device 218 for short-term or long-term storage.

The various methods and processes (such as the method described below with reference to FIG. 3) described further herein may be stored as executable instructions in non-transitory memory on a computing device (or controller) in imaging system 200. In one embodiment, image reconstructor 230 may include such executable instructions in non-transitory memory, and may apply the methods described herein to reconstruct an image from scanning data. In another embodiment, computing device 216 may include the instructions in non-transitory memory, and may apply the methods described herein, at least in part, to a reconstructed image after receiving the reconstructed image from image reconstructor 230. In yet another embodiment, the methods and processes described herein may be distributed across image reconstructor 230 and computing device 216.

In one embodiment, the display 232 allows the operator to evaluate the imaged anatomy. The display 232 may also allow the operator to select a volume of interest (VOI) and/or request patient information, for example, via a graphical user interface (GUI) for a subsequent scan or processing.

Though a CT system is described by way of example, it should be understood that the present techniques may also be useful when applied to images acquired using other imaging modalities, such as tomosynthesis, positron emission tomography (PET), single-photon emission computed tomography (SPECT), C-arm angiography, and so forth. The present discussion of a CT imaging modality is provided merely as an example of one suitable imaging modality.

Figure 3:
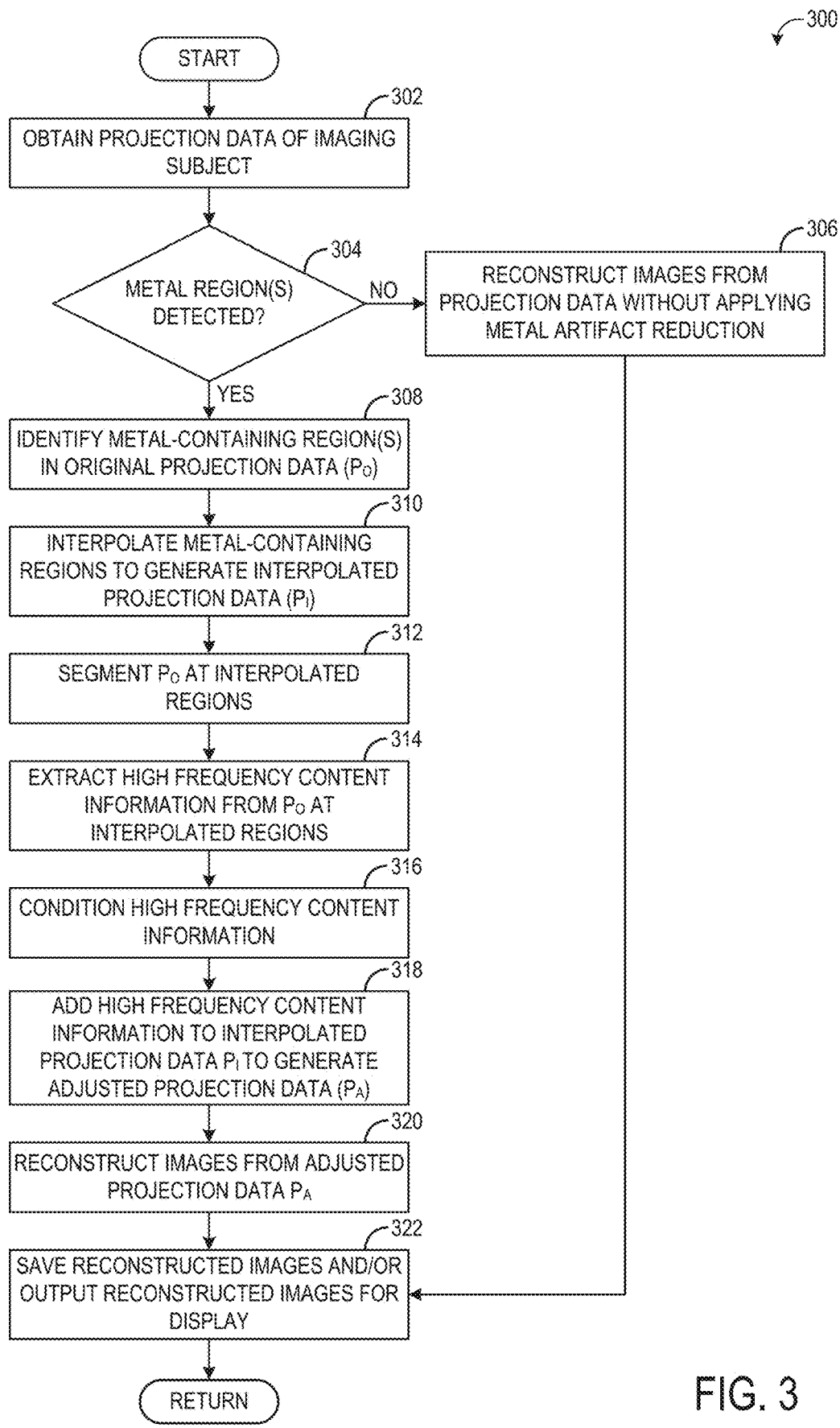
FIG. 3 shows a flow chart illustrating an example method for metal artifact reduction with resolution preservation.

FIG. 3 is a flow chart illustrating a method 300 for metal artifact reduction that addresses metal artifacts during image reconstruction while preserving image resolution, according to an embodiment of the disclosure. Method 300 is described with regard to the systems and components of FIGS. 1-2, though it should be appreciated that the method 300 may be implemented with other systems and components without departing from the scope of the present disclosure. Method 300 may be carried out according to instructions stored in non-transitory memory of an image processing system, such as computing device 216 and/or image reconstructor 230 of FIG. 2. Method 300 is described below with respect to mitigating artifacts due to the presence of metal. However, it is to be understood that the embodiments described herein (e.g., removal of corrupted projection data and interpolation over the removed data with the addition of high frequency content) may be performed to mitigate artifacts due to the presence of other dense objects, such as a dense bolus of contrast agent.

At 302, projection data of an imaging subject is obtained. The projection data includes x-ray radiation attenuation measurements obtained from a detector array of a CT imaging system (e.g., detector 108 of CT imaging system 100). The projection data may include one or more views, with each view including the projection data obtained at one gantry or view angle. At 304, method 300 includes determining if one or more metal (or other high-density) regions are present in the original projection data (referred to as $P_O$). As used herein, the term "metal" is used to denote objects or pixels/voxels in an image corresponding to high x-ray attenuation properties, even if those objects are not metal. The presence of the one or more metal regions may be determined by reconstructing one or more images from the original projection data and identifying the presence or absence of metal in each reconstructed image. The metal may be identified based on image processing techniques by analyzing pixel or voxel intensity of one or more regions of the reconstructed images. For example, a metal mask may be generated wherein each pixel/voxel that has an intensity that is greater than a threshold is included in the mask, and one or more metal regions may be identified based on the mask. Other mechanisms for determining the presence or absence of metal are possible, such as machine learning techniques, user input (e.g., a user may enter input identifying which pixels of an image are part of a metal artifact), etc. For identifying the metal, a standardized reconstruction may be used looking at the full field of view to help ensure all metal objects are identified even if they are outside a user prescribed targeted reconstruction.

Figure 4:
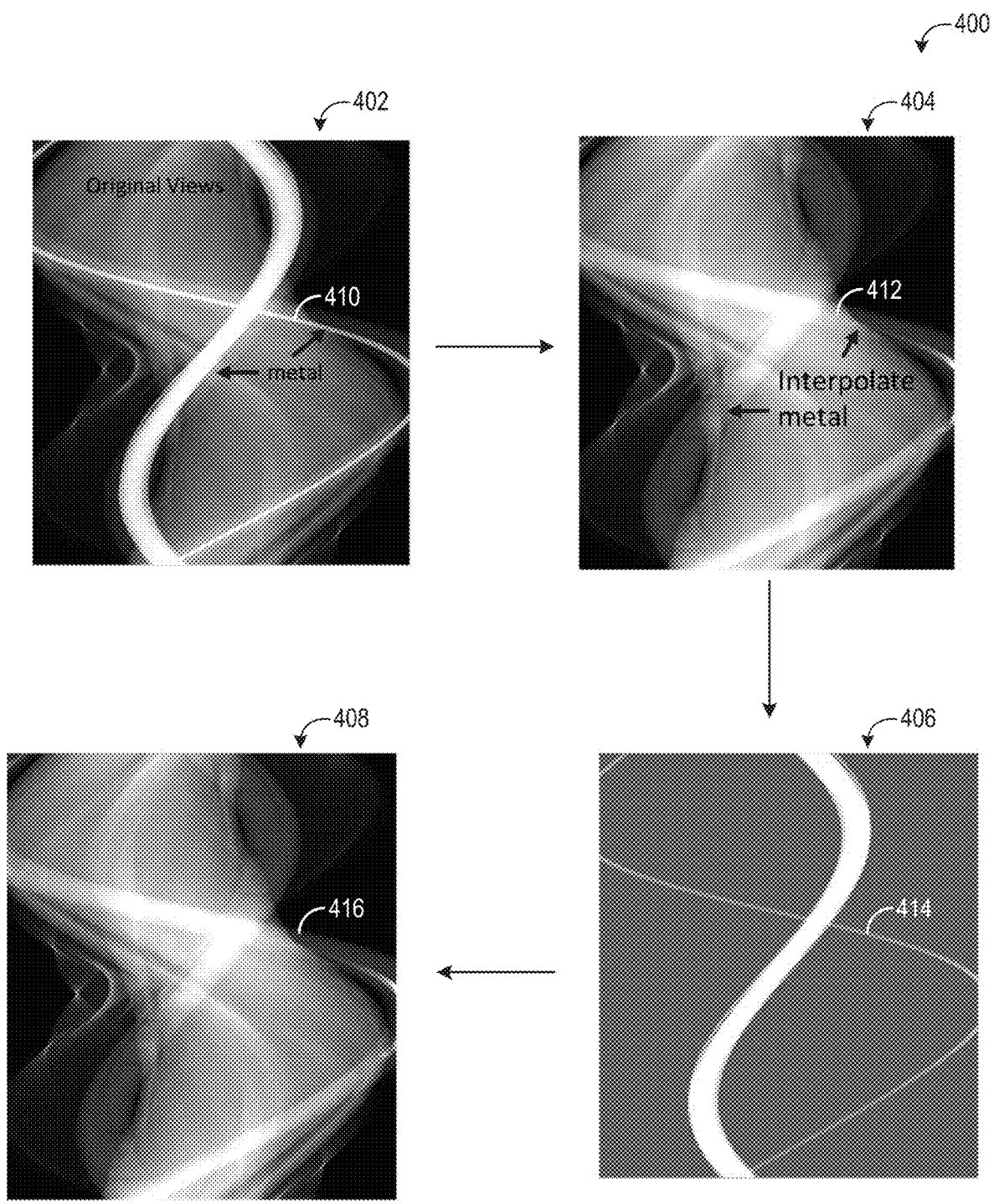
FIG. 4 shows an example sequence of images representing various aspects of the method of FIG. 3.

FIG. 4 shows an example sequence of sinogram images 400 that represent various aspects of the metal artifact reduction method described herein with respect to FIG. 3. The sequence of sinogram images 400 includes a first sinogram image 402. The first sinogram image 402 represents the original projection data. As appreciated by first sinogram image 402, metal 410 is present in the original projection data (as also shown by the arrows pointing to high intensity regions of first sinogram image 402).

If no metal is detected, method 300 proceeds to 306 to reconstruct one or more images from the projection data without applying a metal artifact reduction method. For example, one or more diagnostic images may be reconstructed using known reconstruction techniques, such as filtered back projection or iterative reconstruction. The reconstruction performed for generating the diagnostic images may be the same reconstruction process as used to identify the metal, or a different reconstruction process. For example, the user may reconstruct CT image data with various techniques, such as generating a higher resolution image by using a different filter back projection kernel (reconstruction kernel) or by targeting a certain anatomy and adjusting the field of view. The images may be reconstructed based on data acquired from each view. At 322, the one or more diagnostic images may be output to a display device (e.g., display device 232) for display to an operator or a physician, to a storage medium (e.g., mass storage 218) for retrieving at a later time, and so on. Method 300 may then return.

Returning to 304, if one or more metal regions are detected, method 300 proceeds to 308 to identify metal-containing region(s) in the original projection data $P_O$. For example, a region of metal or other high-density material is identified in a reconstructed image, as explained above. The identified region in the reconstructed image is mapped back to the original projection data, and every component of the projection data determined to include/be corrupted by metal is identified as the metal-containing region(s) of the original projection data. For example, each detector element of the detector array that is determined to output projection data in a metal-containing region or be corrupted by the metal may be identified, and the projection data from those detector elements may be identified as the metal-containing region(s). In this way, metal may be identified in the image space domain from a standardized reconstruction. CT numbers may be used to determine which image pixels contain metal. The metal is then mapped back to the projection space domain and can be segmented and interpolated, as described below.

At 310, the metal-containing region(s) of the projection data are interpolated in order to remove the projection data in the metal-containing region(s) and replace the projection data in the metal-containing region(s) with interpolated, non-corrupted data, thereby generating interpolated projection data ($P_I$). The interpolation may include a weighted interpolation where projection data from neighboring, non-metal containing detector elements is used to estimate projection data from the metal-containing detector elements. For example, the interpolation may include interpolating in row, channel, and view directions using valid neighbors of a metal-containing detector element, assigning weights to each of the neighbors, and replacing the data of the metal-containing detector element by the sum of the weighted neighbors. In addition, previously interpolated projection data can be used when interpolating in the view direction. An example of interpolated projection data is shown as second sinogram image 404 of FIG. 4. Upon identifying the metal-containing regions (e.g., metal 410) in the first sinogram image 402 of FIG. 4, the metal-containing regions are interpolated as described above to generate interpolated regions 412. The arrows in the second sinogram image 404 also point to the interpolated regions, where the metal-corrupted projection data is interpolated.

At 312, the interpolated regions from the original (non-interpolated) projection data are segmented, thereby extracting the original projection data in the interpolated/metal-containing regions. FIG. 4 shows an example segmented sinogram image 406 representing the regions 414 of the projection data that are segmented. In the segmented sinogram image 406, the white pixels represent the interpolated regions and the gray pixels represent the non-interpolated regions. The identified projection data is extracted while the remaining original projection data is discarded (for the purpose of the extraction of the high frequency content information described below) to generate an original segmented view (e.g., the original projection data of only the interpolated/metal-containing regions).

At 314, high frequency content information from the segmented interpolated regions of the projection data $P_O$ is extracted. The high frequency content information may include a subset of all the frequency content information of the original projection data within the interpolated regions, such as an upper portion (e.g., upper half) of all the frequency content information. To extract the high frequency content information, a 2-D filter or 3-D filter (e.g., channel, row, views) may be applied to the original segmented view to smooth the data out, and the resultant smoothed segmented view may be subtracted from the original segmented view to extract the high frequency content. The filter may be a suitable filter, such as a Gaussian filter (in the view domain and/or frequency domain in each view). For example, the projection data of the original segmented view may be transformed to the frequency domain (e.g., via a Fourier transform), and the filter may be a low-pass filter that has a cut off that is in the middle of the frequency space. The remaining frequency content (e.g., the low frequency content) may be subtracted from the frequency content of the original segmented view to extract only the high frequency content information. Extracting the high frequency content information may include excluding at least some lower frequency content information (e.g., a lower portion/half of all the frequency content information of the projection data within the interpolated regions).

Any of the higher frequency content (anything above DC) may be useful in retaining some amount of resolution. The specific filter applied may be selected based on the acquisition system and the desired results, trading off image noise, resolution, and artifact. Further, the filter that is applied may be selected based on the clinical task. For example, for high resolution scanning, such as muscular skeletal, increased resolution may be more important than the negative impact of noise increase; whereas in non-contrast head imaging, noise may be a bigger concern than resolution. The filtration may also be selected so as not to introduce CT number shifts in the final image. One example of filter that may be used is a 3×3 boxcar filter [⅑ ⅑ ⅑; ⅑ ⅑ ⅑; ⅑ ⅑ ⅑], however a more complicated filter could be used to extract the desired frequencies to achieve the desired end results.

At 316, the high frequency content information is conditioned. Conditioning the high frequency content information may include performing thresholding and/or morphological operations, such as weighting the high frequency content, thresholding the high frequency content, and/or filtering the high frequency content information, in order to remove high frequency content information of the original projection data that may cause artifacts in the final images, such as streaking. In one example, the conditioning may include applying a weighting to reduce the contribution of the high frequency content information at the edges of the metal. In another example, the conditioning may include thresholding where the high frequency content information having a projection intensity value over a threshold is discarded or clipped to a value such as the threshold value. Another example of the conditioning may include further frequency filtration to target and reduce a specific frequency/frequencies that is known to cause artifacts in the resulting image. In some examples, more than one conditioning process may be applied to the high frequency content information, such as weighting and thresholding the high frequency content information. In some examples, different conditioning processes may be applied for different types of metal artifacts, different anatomical features, or other factors. For example, a first conditioning process may be applied when the metal artifact is relatively small (e.g., a dental filling) and a second, different conditioning process may be applied when the metal artifact is relatively large (e.g., a prosthetic knee).

At 318, the high frequency content information (e.g., the conditioned high frequency content information) is added back to the interpolated projection data $P_I$ to generate adjusted projection data ($P_A$). For example, the extracted, conditioned high frequency content information is added back to the interpolated projection data that was interpolated at 310. The high frequency content information may be simply added to the interpolated projection data, or the high frequency content information may be adaptively added, where the high frequency content information is weighted, blended, etc., with the interpolated projection data. An example sinogram image showing adjusted projection data is shown at final sinogram image 408 of FIG. 4. Final sinogram image 408 is generated by adding the high frequency content information from the segmented sinogram image 406 to the interpolated, second sinogram image 404. In this way, the metal artifacts may be identified and interpolated over, such as in region 416. However, the high frequency content information that may be lost in the interpolation process may be extracted from the original projection data and added back in to the interpolated projection data. It is to be understood that the interpolation, segmentation, high frequency content extraction, and addition of the high frequency content information to the interpolated projection data may be performed for each view of the projection data in which metal-containing detector elements are detected.

At 320, one or more images are reconstructed from the adjusted projection data $P_A$. The image reconstruction may use filtered back projection, iterative reconstruction, or another suitable reconstruction technique. The images may be reconstructed based on data acquired from each view. At 322, the one or more diagnostic images may be output to a display device (e.g., display device 232) for display to an operator or a physician, to a storage medium (e.g., mass storage 218) for retrieving at a later time, and so on. Method 300 may then return.

In some examples, some or all of the above-described metal artifact reduction method may be performed using machine learning, such as one or more deep learning models. For example, the identification of the metal-containing regions in the projection data and/or interpolation of the metal-containing regions may be performed by a deep learning model. Additionally or alternatively, the extraction of the high frequency content information and/or conditioning of the extracted high frequency content information may be performed by one or more deep learning models. For example, a deep learning model may be trained to apply a filter or otherwise extract selected frequency content (e.g., the high frequency content information described herein) from segmented projection data. Additionally or alternatively, a deep learning model may be trained to identify which conditioning process (from among a plurality of different conditioning processes) should be applied to the extracted high frequency content information in order to optimally condition the high frequency content information. Such a deep learning model may be trained with a plurality of training datasets, with each training dataset including a conditioning process and corresponding indication of a relative level of success (e.g., as determined by an expert) that the conditioning process maintained image resolution without introducing residual artifacts. In some examples, the conditioning itself may be performed by the deep learning model. For example, the deep learning model may be trained to apply a weighting scheme and/or thresholding to the high frequency content information. The training may be based on image datasets with the undesired input and the desired output for the conditioning step. Generating the image datasets may be a manual process where an expert looks at each individual image set and optimizes the conditioning for that exam so that the deep learning model applies the optimal conditioning for each specific CT scan.

FIG. 5 shows a set of images 500 illustrating metal artifacts, conventional metal artifact reduction, and the metal artifact reduction of the present disclosure. The set of images 500 includes a first column 510 of images, a second column 520 of images, and a third column 530 of images. Each image in the first column 510 shows a different section of an anatomical feature of a patient having a non-corrected metal artifact(s), each image in the second column 520 shows a first correction to the corresponding metal artifact where the high frequency content information is not included in the correction, and each image in the third column 530 shows a second correction to the corresponding metal artifact where the high frequency content information is added back during the correction. The images in the second column 520 are images reconstructed from the same projection data as the images in the first column 510 (e.g., showing the axial, coronal, and sagittal views of the knee of the patient), but with the application of the conventional metal artifact reduction. The images in the third column 530 are images reconstructed from the same projection data as the images in the first column 510 (e.g., showing the axial, coronal, and sagittal views of the knee of the patient), but with the application of the metal artifact reduction of the present disclosure.

Referring to the first row of images, a first image 502 is an axial view of a knee of a patient, where the patient has a knee implant (e.g., knee replacement) that includes multiple pieces of metal. Without performing any metal artifact reduction, patient anatomy near the metal is difficult to visualize, and the metal causes various artifacts, including streaking, aliasing, shadowing, saturation of pixels near the metal, etc. As an example, the arrow in the first image 502 is pointing to a streaking/shadowing artifact caused by the metal, where anatomical features away from the metal are not visible.

A second image 504 shows the axial view of the knee of the patient shown in the first image 502, but with a metal artifact reduction method applied to reduce the effects of the metal. The metal artifact reduction that is applied to generate the second image 504 may include identifying the metal-containing regions in the projection data and interpolating those regions. While the interpolation reduces the effects of the metal and allows adjacent anatomical features to be better visualized (e.g., relative to the first image 502), artifacts may still be present, and loss of resolution may occur due to the interpolation. For example, the arrow in the second image 504 is pointing to a region of streaking/shadowing caused by the metal. Other issues are also visible in the second image 504, such as low resolution in the center of the knee and low resolution around the edges of the metal.

A third image 506 shows the axial view of the knee of the patient shown in the first image 502, but with the metal artifact reduction method of the present disclosure applied to reduce the effects of the metal. The metal artifact reduction that is applied to generate the third image 506 may include identifying the metal-containing regions in the projection data, interpolating those regions, extracting/conditioning the high frequency content information of the original projection data in the interpolated regions, and adding the conditioned high frequency content information back to the interpolated projection data. In one example, the third image 506 may be generated by applying a 2D filter to extract the high frequency content and conditioning the high frequency content via an adaptive weighting with a thresholding to clip extreme values, before adding the conditioned frequency content back to the interpolated projection. As appreciated by the arrow in the third image 506, the streaking/shadowing present in the second image 506 has been addressed, and the anatomical features in the region of the arrow are visible. The resolution of the center of the knee is increased in the third image 506 relative to the second image 504, and the anatomical features at the edge of the metal are visible. Thus, the inclusion of the high frequency content information in the interpolated projection data results in reconstructed images of higher resolution and having fewer/less severe artifacts.

A fourth image 508, a fifth image 512, and a sixth image 514 each show a coronal section of the knee of the patient including the metal-containing knee implant, without metal artifact reduction (fourth image 508), with conventional metal artifact reduction (fifth image 512), and with the metal artifact reduction of the present disclosure (sixth image 514). The arrows in the fifth image 512 point to some of the low-resolution regions that are corrected/improved in the sixth image 514.

A seventh image 516, an eighth image 518, and a ninth image 522 each show a sagittal section of the knee of the patient including the metal-containing knee implant, without metal artifact reduction (seventh image 516), with conventional metal artifact reduction (eighth image 518), and with the metal artifact reduction of the present disclosure (ninth image 522). The arrows in the eighth image 518 point to some of the low-resolution regions that are corrected/improved in the ninth image 522.

FIG. 6 shows a set of images 600 including a first column 610 of images, a second column 620 of images, and a third column 630 of images. The images in the first column 610 include an axial section, a coronal section, and a sagittal section of a spine of a patient including metal screws. The images of the first column 610 are uncorrected and thus display high levels of artifacts due to the presence of the metal screws. The images in the second column 620 are images reconstructed from the same projection data as the images in the first column 610 (e.g., showing the axial, coronal, and sagittal views of the spine of the patient), but with the application of the conventional metal artifact reduction. The images in the third column 630 are images reconstructed from the same projection data as the images in the first column 610 (e.g., showing the axial, coronal, and sagittal views of the spine of the patient), but with the application of the metal artifact reduction of the present disclosure. The arrows in the images of the third column 630 point to regions where image resolution was improved relative to the corresponding image of the second column 620 and/or where various artifacts were reduced/resolved, such as streaking or shadowing.

The technical effect of adding in high frequency content information to interpolated regions of projection data and then reconstructing images from the projection data is that metal artifacts may be reduced while maintaining image resolution.

In another representation, a method includes reconstructing one or more diagnostic images from an adjusted projection dataset, the adjusted projection dataset including a metal-containing region comprising high frequency content information extracted from an original projection dataset at the metal-containing region and interpolated projection data.

An example provides for a method including obtaining projection data of an imaging subject; identifying a metal-containing region in the projection data; interpolating the metal-containing region to generate interpolated projection data; extracting high frequency content information from the projection data in the metal-containing region; adding the extracted high frequency content information to the interpolated projection data to generate adjusted projection data; and reconstructing one or more diagnostic images from the adjusted projection data. In a first example of the method, adding the extracted high frequency content information to the interpolated projection data comprises conditioning the extracted high frequency content information and adding the conditioned high frequency content information to the interpolated projection data. In a second example of the method, which optionally includes the first example, conditioning the extracted high frequency content information comprises weighting and/or thresholding the high frequency content information. In a third example of the method, which optionally includes one or both of the first and second examples, conditioning the extracted high frequency content information comprises conditioning the high frequency content information via a deep learning model. In a fourth example of the method, which optionally includes one or more or each of the first through third examples, extracting the high frequency content information comprises segmenting the metal-containing region of the projection data, transforming the segmented projection data to the frequency domain, and applying a filter to the segmented projection data in the frequency domain to extract the high frequency content information. In a fifth example of the method, which optionally includes one or more or each of the first through fourth examples, the filter is a low-pass filter and wherein applying the low-pass filter to the segmented projection data to extract the high frequency content information comprises filtering out the high frequency content information via the low-pass filter and subtracting the filtered segmented projection data from the segmented projection data to extract the high frequency content information. In a sixth example of the method, which optionally includes one or more or each of the first through fifth examples, the low-pass filter has a cut-off in a middle of the frequency content of the projection data in the frequency domain. In a seventh example of the method, which optionally includes one or more or each of the first through sixth examples, extracting the high frequency content information comprises extracting the high frequency content information via a deep learning model. In an eighth example of the method, which optionally includes one or more or each of the first through seventh examples, identifying the metal-containing region in the projection data comprises reconstructing one or more initial images from the projection data, identifying one or more pixels of the one or more initial images having an intensity greater than a threshold intensity, and mapping the identified one or more pixels back to the projection data.

An example provides for a method, including removing projection data from a metal-containing region of an original projection dataset, including removing all frequency content of the projection data in the metal-containing region; replacing the removed projection data in the metal-containing region with interpolated projection data; adding back a subset of the frequency content of the removed projection data to the interpolated projection data to generate an adjusted projection dataset; and reconstructing one or more images from the adjusted projection dataset. In a first example of the method, the subset of the frequency content comprises an upper portion of the frequency content, and further comprising excluding at least some of a lower portion of the frequency content from the adjusted projection dataset. In a second example of the method, which optionally includes the first example, the method further includes conditioning the subset of the frequency content before adding the subset of the frequency content back to the interpolated projection data. In a third example of the method, which optionally includes one or both of the first and second examples, conditioning the subset of the frequency content comprises conditioning the subset of the frequency content via thresholding and/or morphological operations. In a fourth example of the method, which optionally includes one or more or each of the first through third examples, conditioning the subset of the frequency content comprises conditioning the subset of the frequency content via a deep learning model.

An example of an image processing system includes a processor; and a non-transitory memory storing instructions executable by the processor to: interpolate a metal-containing region of a projection dataset of an imaging subject to generate an interpolated projection dataset; extract high frequency content information from the projection dataset in the metal-containing region; condition the high frequency content information; add the conditioned high frequency content information to the interpolated projection dataset to generate an adjusted projection dataset; and reconstruct one or more diagnostic images from the adjusted projection dataset. In a first example of the system, the non-transitory memory stores one or more deep learning models configured to extract the high frequency content information from the projection dataset in the metal-containing region and/or condition the high frequency content information. In a second example of the system, which optionally includes the first example, the high frequency content comprises a subset of all frequency content of the projection dataset in the metal-containing region. In a third example of the system, which optionally includes one or both of the first and second examples, the instructions to condition the high frequency content information comprise instructions to weight and/or threshold the high frequency content information. In a fourth example of the system, which optionally includes one or more or each of the first through third examples, the instructions are executable to identify the metal-containing region of the projection dataset by reconstructing an initial image from the projection dataset, generating a metal mask that includes each metal-containing pixel of the initial image, and map the metal mask back to the projection dataset. In a fifth example of the system, which optionally includes one or more or each of the first through fourth examples, the projection dataset is acquired by a computed tomography (CT) imaging system.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
obtaining original projection data of an imaging subject;
identifying a metal-containing region in the original projection data;
interpolating the metal-containing region to generate interpolated projection data, wherein the interpolated projection data is projection data;
extracting high frequency projection data from the original projection data in the metal-containing region, including segmenting the metal-containing region of the original projection data, transforming the segmented projection data to the frequency domain, and applying a filter to the segmented projection data in the frequency domain;
conditioning the high frequency projection data via a deep learning model trained to select a conditioning process from among a plurality of different conditioning processes to be applied and apply the selected conditioning process to the high frequency projection data;
adding the conditioned extracted high frequency projection data to the interpolated projection data to generate adjusted projection data; and
reconstructing one or more diagnostic images from the adjusted projection data.

2. The method of claim 1, wherein conditioning the extracted high frequency projection data comprises weighting and thresholding the high frequency projection data.

3. The method of claim 1, wherein the filter is a first filter and wherein conditioning the extracted high frequency projection data comprises applying a second filter to the extracted high frequency projection data, the second filter configured to filter one or more frequencies known to cause image artifacts.

4. The method of claim 1, wherein the filter is a low-pass filter.

5. The method of claim 4, wherein the low-pass filter has a cut-off in a middle of the frequency content of the projection data in the frequency domain.

6. The method of claim 1, wherein transforming the segmented projection data to the frequency domain comprises transforming the segmented projection data to the frequency domain via a Fourier transform.

7. The method of claim 1, wherein identifying the metal-containing region in the original projection data comprises reconstructing one or more initial images from the projection data, identifying one or more pixels of the one or more initial images having an intensity greater than a threshold intensity, and mapping the identified one or more pixels back to the original projection data, such that every component of the original projection data determined to be corrupted by metal is identified as the metal-containing region of the original projection data.

8. A method, comprising:
   removing projection data from a metal-containing region of an original projection dataset, including removing all frequency content of the projection data in the metal-containing region;
   replacing the removed projection data in the metal-containing region with interpolated projection data;
   conditioning a subset of the frequency content of the removed projection data via a deep learning model trained to select a conditioning process from among a plurality of different conditioning processes and apply the selected conditioning process to the subset of the frequency content;
   adding back the conditioned subset of the frequency content of the removed projection data to the interpolated projection data to generate an adjusted projection dataset, wherein the interpolated projection data is projection data; and
   reconstructing one or more images from the adjusted projection dataset using an iterative or analytic image reconstruction technique.

9. The method of claim 8, wherein the subset of the frequency content comprises a high frequency content subset of the frequency content, the high frequency content subset including frequency content that has a higher frequency than a remaining subset of the frequency content, and further comprising excluding at least some of the remaining subset of the frequency content from the adjusted projection dataset.

10. The method of claim 8, wherein the deep learning model is trained with a plurality of training datasets, each training dataset including a conditioning process and a corresponding indication of a relative level of success as determined by an expert that the conditioning process maintained image resolution without introducing residual artifacts.

11. An image processing system, comprising:
   a processor; and
   a non-transitory memory storing instructions executable by the processor to:
      interpolate a metal-containing region of a projection dataset of an imaging subject to generate an interpolated projection dataset, wherein the interpolated projection dataset comprises projection data;
      extract high frequency content information from the projection dataset in the metal-containing region;
      condition the high frequency content information by thresholding the high frequency content information, the thresholding including discarding or clipping high frequency content information having a projection intensity value over a threshold;
      add the conditioned high frequency content information to the interpolated projection dataset to generate an adjusted projection dataset; and
      reconstruct one or more diagnostic images from the adjusted projection dataset.

12. The image processing system of claim 11, wherein the non-transitory memory stores one or more deep learning models configured to extract the high frequency content information from the projection dataset in the metal-containing region and/or condition the high frequency content information.

13. The image processing system of claim 11, wherein the high frequency content comprises a subset of all frequency content of the projection dataset in the metal-containing region.

14. The image processing system of claim 11, wherein the instructions are executable to identify the metal-containing region of the projection dataset by reconstructing an initial image from the projection dataset, generating a metal mask that includes each metal-containing pixel of the initial image, and mapping the metal mask back to the projection dataset.

15. The image processing system of claim 11, wherein the projection dataset is acquired by a computed tomography (CT) imaging system and includes radiation attenuation measurements detected by a plurality of detector elements, wherein reconstructing the one or more diagnostic images from the adjusted projection dataset comprises using filtered backprojection to reconstruct the one or more diagnostic images, and wherein interpolating the metal-containing region of the projection dataset includes identifying, in row, channel, and view directions, valid neighbors of each metal-containing detector element, assigning weights to each of the neighbors, and replacing projection data of each metal-containing detector element by a sum of its weighted neighbors.

* * * * *